2 Sheets—Sheet 1.

D. CONDON.
VENTILATING SKYLIGHTS FOR VESSELS, &c.

No. 184,955. Patented Dec. 5, 1876.

Witnesses:

Daniel Condon,
Inventor

THE GRAPHIC CO. N.Y.

2 Sheets—Sheet 2.
D. CONDON.
VENTILATING SKYLIGHTS FOR VESSELS, &c.
No. 184,955. Patented Dec. 5, 1876.
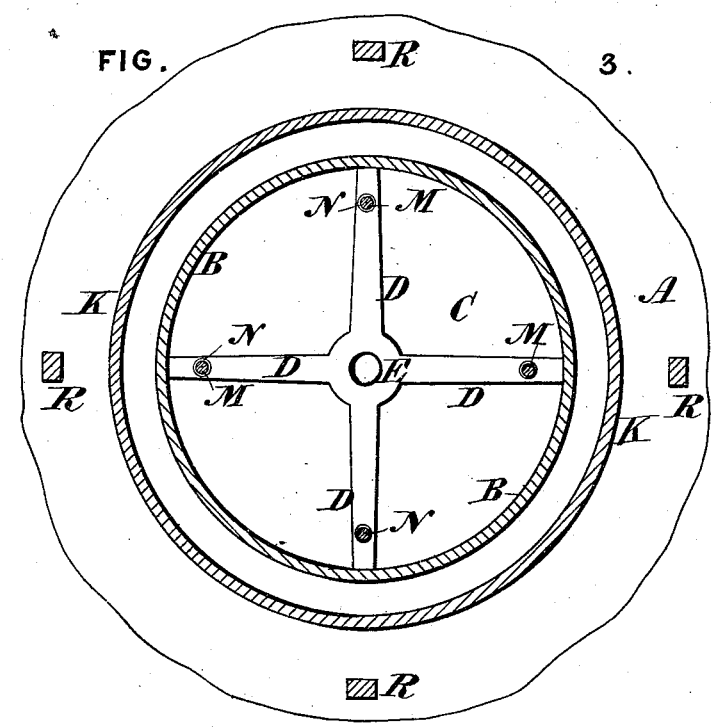
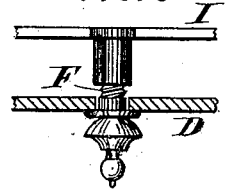
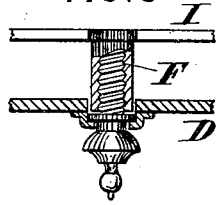
Witnesses:
Rob.t Arthur Kelland
William J Kerr.
Daniel Condon
Inventor
per att.

UNITED STATES PATENT OFFICE.

DANIEL CONDON, OF PORT MEDWAY, NOVA SCOTIA, CANADA, ASSIGNOR OF ONE-HALF HIS RIGHT TO EDWIN COLLINS SEELY, OF SAME PLACE.

IMPROVEMENT IN VENTILATING-SKYLIGHTS FOR VESSELS, &c.

Specification forming part of Letters Patent No. 184,955, dated December 5, 1876; application filed October 12, 1876.

*To all whom it may concern:*

Be it known that I, DANIEL CONDON, of the village of Port Medway, in Queens county, Province of Nova Scotia, Canada, ship-carpenter, have invented certain new and useful Improvements on Skylights and other Lights for Ships and other Vessels; and I do hereby declare that the following is a full, clear, and exact description of the same.

This invention has reference to improvements in deck and other skylights, and lights of ships and other vessels, used not only for light, but also for ventilation, to produce the same in a simpler and, in every respect, a more desirable form, but more especially as regards the securing of the skylight, and rendering it self-acting in closing whenever outward pressure is applied to them, as in the case of shipping seas, &c.

Figure 1:
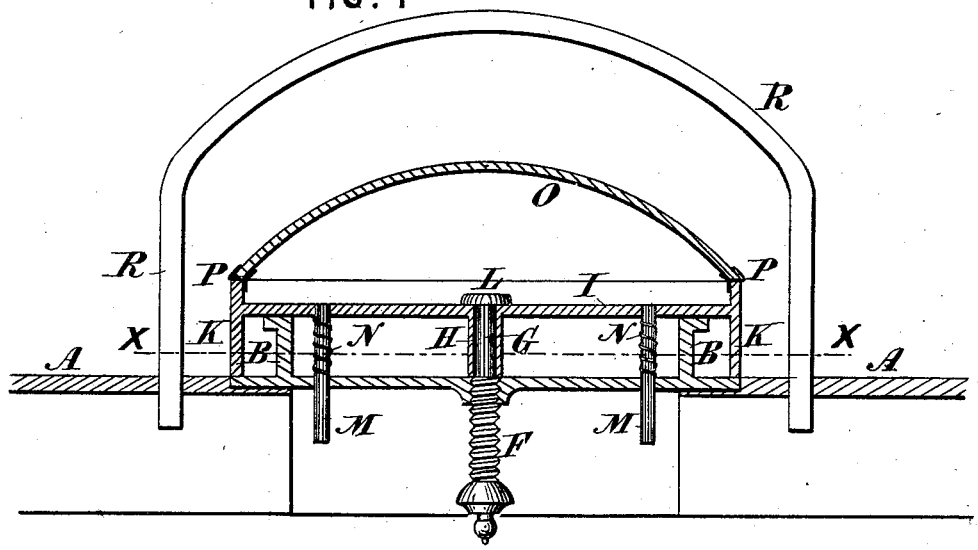
Figure 2:
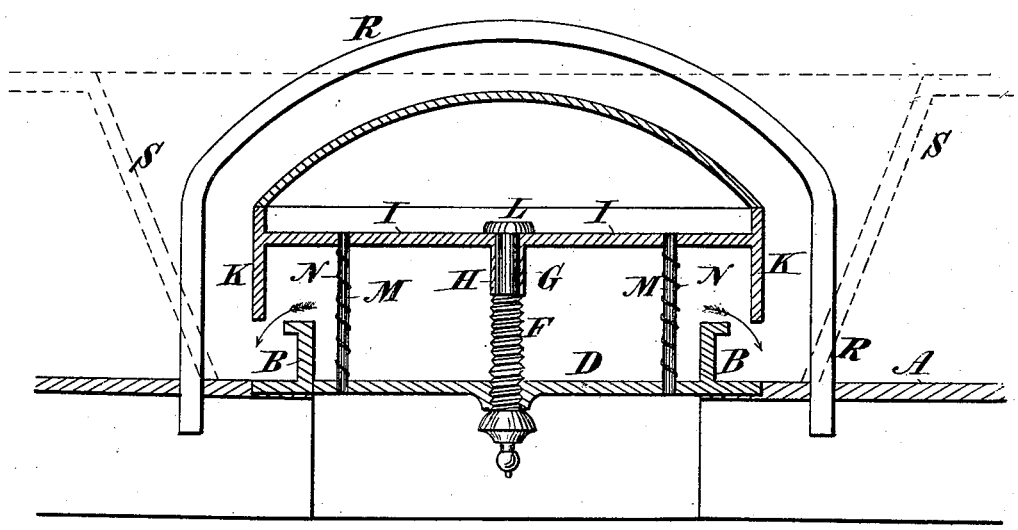

Reference being had to the annexed drawings, where similar letters of reference indicate like parts, Figure 1 represents a transverse section embodying my invention in the position of "down" or shut. Fig. 2 represents a transverse section of Fig. 1 in the position of "up" or open. Fig. 3 represents a section on line X X, Fig. 1. Fig. 4 represents a modification of joint. Fig. 5 represents a modification of screw. Fig. 6 represents a modification of screw.

Letter A is the vessel's deck. B is a flange, as shown in the drawings, of circular form, which, however, is not material. The flange B is open in the center, as at C; but this opening is intersected by any suitable number of radial arms, D, terminating in one common hub or center, E, as shown in Figs. 1, 2, and 5. A screwed opening is formed in E to receive in it the screwed spindle F, the upper part of which is made in the form of a plain spindle, G, to receive upon it the sleeve H. This has radial arms I proceeding from it, in the same manner as those D. From the center E these unite with a cover or cylinder, K, in a similar manner that D does with B. Care must, however, be taken, in situating the vertical position of the arms I, that they will be placed high enough up in K, so that they will not rest upon the upper edge of B before the bottom edge of K is fully pressed down on the lower part of the flange B, and in some cases it may be preferable to place them higher than as shown in the drawings, to give a considerable amount of clearance. L is any suitable nut or washer, screwed or riveted upon the end of the spindle G, but in such a manner that the spindle can freely revolve within the sleeve H. M are steadying and guiding bars, securely fastened in I, and sliding through suitable corresponding openings in D. To remove a portion of the friction in working the screw F in E, spiral springs N are placed upon them. O is the cap covering the whole of the above-described parts. This may either consist of a thick casting in glass, or it may be any suitable frame-work with strong glass inserted therein, in any ordinary and suitable way. The joint K may be either made as shown at P in Fig. 1, or as at Q in Fig. 4, or in any other ordinary manner, rubber or other hydraulic compound or cement being used to render it water-tight.

I also propose to insert a strip of rubber in the bottom edge of the cylinder K, to form a water-tight joint between it and the lower part of B, on which it rests, and also to deaden any concussion in case of the parts coming suddenly together when made self-closing, as will be hereinafter described. R is any suitable guard to protect the glass, &c.

Fig. 5 shows a detail modification of the arrangement of the screw F, so little differing from that described in Figs. 1 and 2 as to require no verbal explanation.

Fig. 6 shows a modification of the screw F arranged, as will be easily understood, to simply draw the skylight O K down, or to regulate the amount it is to be allowed to be opened, while the springs N are made with sufficient expansive force to uphold the skylight to whatever amount the screw F is adjusted. It will be therefore seen that when outward pressure is applied upon the surface of O sufficient to overcome the expansive force of the springs N the light will close of itself, from the position shown in Fig. 2 to that in Fig. 1, the arrows in the former indicating the free circulation of air, either in or out, through the opening thus formed.

As a further protection from concussion, in case of the light being suddenly closed, in addition to the rubber ring inserted in the bottom of K, above mentioned, a rubber bed for it to rest upon may be formed on the top of the lower part of the flange B.

Lights on this principle may be arranged either of a few inches in diameter in the deck or sides of a vessel, or they may be, when used on the deck, a corresponding number of feet, as desired. When, however, they are arranged in the side, I should prefer to dispense with the guard R, and recess the light in the side, as represented by the dotted lines S in Fig. 2.

As before mentioned, the drawings show the light of circular form; but, if desired, they may be made triangular, square, pentagon, hexagon, or any other regular polygon. It is also capable of being arranged for oblongs or other rectangular figures, and even for irregular forms, the screw F being placed in the center of the area of the light.

What I claim is as follows:

1. The ventilating-skylight, substantially as described, adapted to be adjusted with reference to the opening which it covers, by means substantially such as specified.

2. The combination, substantially as specified, of the ventilating-skylight, the screw for adjusting it, and the springs N.

DANIEL CONDON.

Witnesses:
 THOS. M. DUNPHY,
 J. T. FOSTER.